Patented Feb. 19, 1946

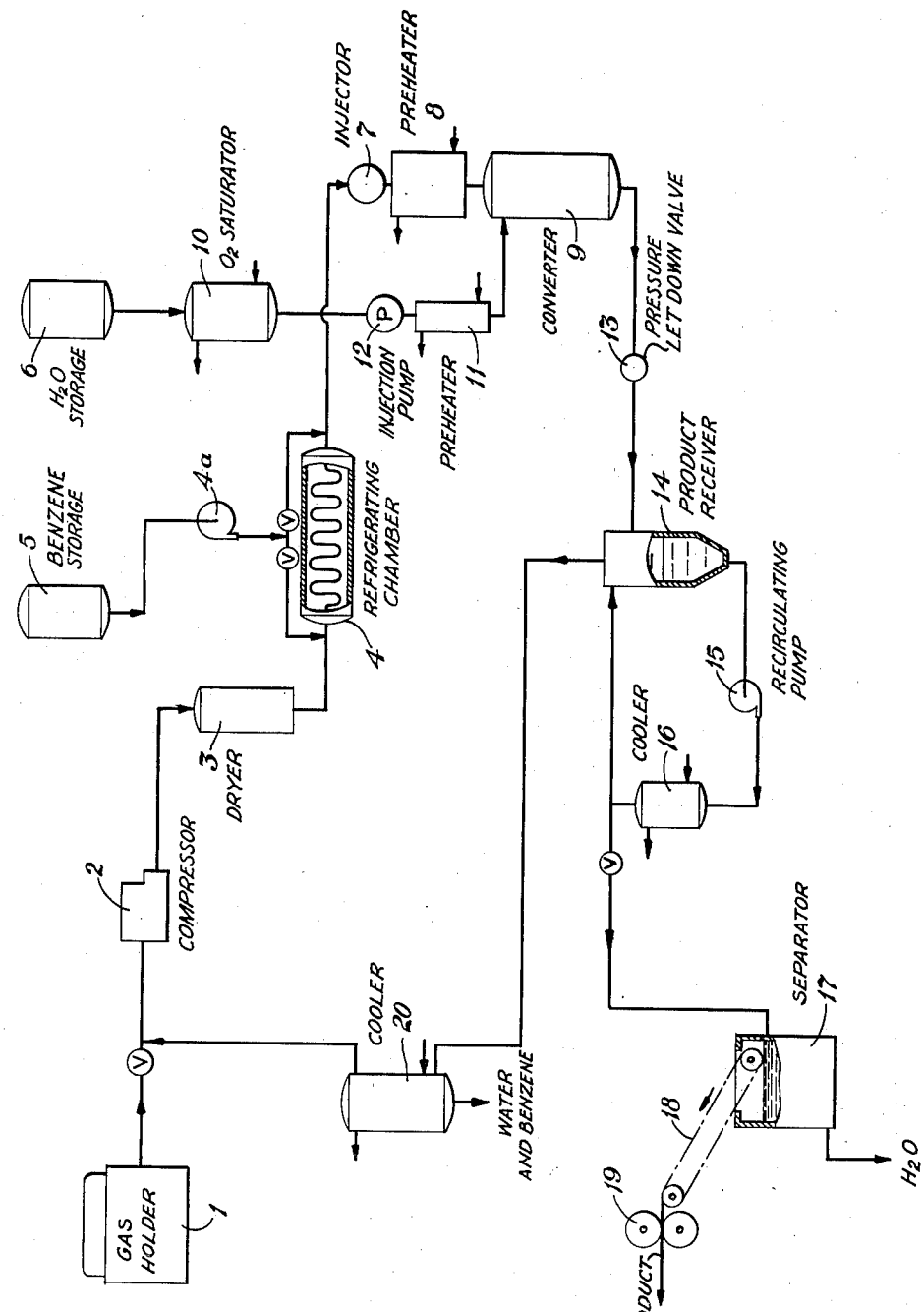

2,395,381

UNITED STATES PATENT OFFICE 2,395,381

PROCESS OF PREPARING ETHYLENE POLYMERS

Lombard Squires, Westtown, Pa., assignor to E. I. du Pont de Nemours & Company, Wilmington, Del., a corporation of Delaware Application February 25, 1943, Serial No. 477,082

5 Claims. (Cl. 260—84)

This invention relates to an improved process for the polymerization of hydrocarbons containing a single ethylenic linkage and is more particularly related to an improved process for the polymerization of ethylene to products of relatively high molecular weight.

Various methods have been proposed for the polymerization of olefines such as ethylene with the principal object of obtaining high molecular weight products for various purposes. Oil-like products of relatively low molecular weight have been prepared from ethylene by its polymerization in the presence of boron fluoride and like catalysts while solid to semi-solid high molecular weight products of a polymeric nature have been obtained by effecting the polymerization in the absence of catalysts or in the presence of peroxygen-type catalysts by treatment at pressures above 50 atmospheres and up to 3,000 atmospheres or more. The invention of the instant case is principally directed toward products of the latter type.

An object of the present invention is to provide a new process for the polymerization of hydrocarbons containing an ethylenic linkage in the presence of addition agents. Another object is to provide a process for the preparation of high molecular weight products from ethylene wherein a liquid addition agent is added to the liquefied ethylene prior to the reaction. A further object is to provide an improved process for the preparation of polymers of ethylene wherein the ethylene is compressed, condensed to a liquid at relatively low pressures, the liquid ethylene mixed with a liquid addition agent and the resulting mixture compressed to superatmospheric polymerization pressures. Other objects and advantages of the invention will hereinafter appear.

In the preparation of high molecular weight polymers of olefinic hydrocarbons containing an ethylenic linkage and more especially in the polymerization of ethylene per se and the preparation of high molecular weight polymers of ethylene with other organic compounds, in the presence of peroxygen-type catalysts or if very high pressures are used in the absence of added catalysts, the reaction is conducted under superatmospheric pressures. The ethylene or other olefinic hydrocarbons can be efficiently and economically brought to reaction pressure by first compressing the gas to approximately its critical pressure, and for ethylene preferably to a pressure between 20 and 150 atmospheres, subsequently cooling the thus compressed gases to a temperature sufficient to liquefy them, that is, for ethylene, to a temperature between —35 and +5° C., thereby converting the gas to a liquid, and thereafter compressing the resulting liquid to the desired reaction pressure.

It has been known that certain addition agents greatly improve the properties of ethylene polymers. For example, the addition of benzene, chlorobenzene, and isooctane while they do not appear to enter into the reaction their presence during the reaction considerably improves the properties of the product. Moreover, other addition agents may be used which will react with the ethylene to form interpolymers such as the polymerizable organic compounds or those addition agents may be used which, although saturated, react to give valuable modification products of ethylene.

According to this invention the introduction of the liquid addition agents into the reaction is greatly facilitated by first compressing the ethylene, cooling it to a liquid, and then thoroughly mixing the addition agent with the liquid ethylene. This procedure is especially beneficial in the preparation of interpolymers for by this method these valuable products may be obtained having consistently uniform properties heretofore obtainable only with great difficulty or not at all when the ethylene is reacted with some of the highly reactive unsaturated compounds.

The invention will be more readily understood by reference to the attached diagrammatic drawing, wherein ethylene from gas holder 1 is drawn through an oil lubricated compressor 2 and its pressure increased to from 20 to 150 atmospheres. Inasmuch as ethylene will contain some moisture, it is passed through a dried 3, containing calcium chloride, solid NaOH or other suitable drying medium, for the removal of the moisture and is then passed into a refrigerating chamber 4 wherein it is cooled to a liquid. Subsequent to liquefaction in refrigerating chamber 4, benzene or other suitable addition agent such as isooctane, chlorobenzene, etc., or a reactant such as vinyl acetate, vinyl chloracetate, methyl methacrylate, etc., may be introduced, by means of the injector 4a from storage tank 5 into the liquid ethylene prior to or subsequent to condensation of the ethylene. Benzene may be introduced at a rate of approximately 0.05 to 2.0 parts thereof per part of the ethylene. Vinyl acetate and similar polymerizable addition agents may be introduced in equal or greater than equal molecular weight proportions with the ethylene, other addition agents being introduced in suitably controlled amounts. The resulting liquid mixture is then raised in the injector 7 to the pressure of polymerization preferably between 800 to 1500 atmospheres although much higher pressures may be used. The resulting mixture is then heated to the desired reaction temperature, in preheater 8, i. e., for example, between approximately 50° and 400° C. after which the compressed reaction mixture is introduced directly into the converter 9. Into converter 9 there likewise may be injected 0.1 to 10.0 parts of water per part of the ethylene, the water being transferred from the storage tank 6 to the oxygene saturator 10, is heated in preheater 11 and forced into the converter 9 by means of the injection pump 12. The total oxygen at this point should be equivalent preferably to about 20 to about 2000 p. p. m. of the ethylene present. The products issuing from the converter pass through a pressure let-down valve 13 from which they are introduced into the product receiver 14. From the bottom of the product receiver 14 wherein the products and water condense the condensate is drawn by a circulating pump 15 into cooler 16 and back into the top of the product receiver 14. The vapors from the top of receiver 14 are returned to the ethylene stream after cooling in cooler 20 to approximately inlet ethylene temperature, condensed water and benzene being separated from the olefine in cooler 20. The cooled ethylene is then returned to the synthesis with the make-up ethylene stream. The liquid mixture from cooler 16 is bled off and the polymers present separated.

The process as described should be designed with due regard to the fact that ethylene hydrates may form when ethylene and water are present together under pressure. Moreover, these hydrates will solidify at temperatures below approximately 50° C. Accordingly all piping carrying ethylene and water under pressure should be kept at a temperature above 40° to 60° C. to prevent solidification and resultant plugging.

As an alternate method of carrying out the process of the invention batch or discontinuous operation can be used. This type operation may be conducted in a closed pressure resisting autoclave. The olefine and liquid addition agent is charged with suitable amounts of catalysts and the reactants brought up to reaction pressure. As the reaction proceeds a pressure drop occurs within the autoclave. Compensation for the pressure drop is provided by the injection of a liquid mixture of ethylene and the addition agent. Briefly stated this feature involves repressuring the reaction vessel by injecting the liquid mixture containing the ethylene and the other constituents of the reaction whenever necessary and as many times as it is necessary to bring the pressure of the reaction to the desired degree. For example this may be done as frequently as the pressure drops 50, 100 or 200 atmospheres or any other desired amount.

The reaction as broadly described above may be carried out in accord with the invention in any suitable type of converter capable of withstanding the high pressures and it is preferably conducted in one having relatively great length to cross section. The converter may be made of high chromium, low nickel steel such as 18% chromium 8% nickel or may be made of alloy steel or mild steel lined with a chrome-steel or other suitable metal such as silver, or with other corrosion resisting liners of chromium, porcelain, etc.

The peroxygen-type catalyst which may be employed with the reaction includes molecular oxygen or air which may be present with respect to the olefine in amounts ranging from 5 to 2,000 p. p. m. (calculated as oxygen). While oxygen is the preferred catalyst other peroxygen-type catalysts may be used, with or without oxygen, such catalysts including dialkyl dioxides (such as diethyl peroxide), hydrogen peroxide, persuccinic acid, lauroyl peroxide, tetralin peroxide, urea peroxide, butyryl peroxide, benzoyl peroxide, alkali metal and alkaline earth metal and ammonium persulfates, perborates, percarbonates and the like. The amount of peroxide catalysts used may vary over a wide range from 0.1% by weight based on the ethylene.

The reaction as has been stated may be conducted with any polymerizable aliphatic mono olefinic hydrocarbon by which is meant one that can be converted to a polymer in the presence of the aforesaid and like catalysts under the pressure and temperature conditions designated. Ethylene, propylene and isobutylene are the most prominent hydrocarbons of this class and of these the most important is ethylene.

The addition agents that can be introduced may be classified under three groups: the first group including those agents which do not appear to enter into the reaction although they markedly improve the product; the second group including those agents which interpolymerize with the ethylene and more particularly the organic compounds which are polymerizable, and the third group including those agents which do not appear to interpolymerize with the ethylene but do react therewith to form modified polymers (such as telomers) and/or high molecular weight products of ethylene.

The amount of the addition agent to be used will, of course, be determined by the type of addition agent used, the addition agents of the first group being used in amounts ranging from 0.025 to 5 parts thereof per part of the ethylene, the addition agents of the second group being used in amounts ranging from as low as 5 to 10% of the ethylene up to greater than equal percentages by weight of ethylene and the agents of the third group being used in amounts ranging between 1 and approximately 10%.

The addition agents of the first group include water and such compounds as benzene, chlorobenzene, bromobenzene, and the halogenated benzenes generally, isooctane, and similar liquid addition agents which may be introduced into the reaction to improve the operation and/or the quality or yield of the products obtained.

The addition agents of the second group include such compounds as propylene, isobutylene, styrene and similar mono-olefinic hydrocarbons; it likewise includes unsaturated organic compounds such as the vinyl esters and more particularly as members of this group vinyl acetate, vinyl formate and the vinyl isobutyrates; and such unsaturated compounds such as acrylic, methacrylic, itaconic, crotonic, and fumaric acids as well as their esters, acid halides, amides, and anhydrides. Other closely related addition agents of this group include vinyl chloride, vinyl chloracetate, vinylidene chloride, vinyl cyanide and N-vinyl amides, vinyl ethers, divinyl butyral and methyl vinyl ketone.

The addition agents of the third group herein called a telogen react with ethylene generally to the extent of one mole of the addition agent combining with a plurality of ethylene molecules. It is believed that the molecular structure of these addition agents break during the reaction, one part combining with one end of the ethylene chain and the other part combining with the opposite end of that chain. Compounds of this group include saturated organic compounds containing carbon, hydrogen, and oxygen, such for example as the saturated aliphatic or aromatic, cyclic, acyclic and alicyclic acids, esters, anhydrides, acetals, aldehydes, alcohols, ethers, and so forth; as well as the halogenated compounds such, for example, as the halogenated hydrocarbons as, for example, carbon tetrachloride, tetrachlorethylene, trichlorethylene, chloroform, and so forth.

The products of the reaction are separated from the reaction mixture in any suitable manner. By reference to the drawing it will be noted that the liquid mixture is bled off into the separator 17 wherein it settles into two layers, the upper layer containing the polymeric product, which is removed from the separator 17 by means of the continuous conveyer belt 18 which travels in the direction of the arrow shown and from the upper surface of this conveyer the moist product passes between the squeegee rolls 19 for the removal of a major portion of the water present. The product may then be delivered to other rolls or mixers, not shown, for the removal of the moisture and/or addition of plasticizers or other addition agents.

I claim:

1. In a continuous process for the preparation of interpolymers of ethylene and vinyl acetate in the presence of a catalyst selected from the group consisting of oxygen and peroxy compounds and at a pressure above 800 atmospheres the steps which comprise continuously passing ethylene through a series of zones involving compression, drying, cooling, mixing, compression and reacting and therein successively compressing the ethylene to between 20 and 150 atmospheres, drying the thus compressed ethylene, cooling the ethylene under this pressure to condense it to a liquid, introducing vinyl acetate, and subsequently compressing the liquid ethylene to pressure between 800 and 300 atmospheres.

2. In a continuous process for the preparation of an interpolymer of ethylene and vinyl acetate in the presence of a catalyst selected from the group consisting of oxygen and peroxy compounds and at a pressure above 800 atmospheres the steps which comprise continuously passing ethylene through a series of zones involving compression, drying, cooling, mixing, compression and reacting and therein successively compressing the ethylene to between 20 and 150 atmospheres, drying the thus compressed ethylene by contact with calcium chloride, cooling the thus dried and compressed ethylene under this pressure to a temperature between —35 and 5° C., thereby condensing it to a liquid, introducing from approximately 10% to approximately 75% by weight of vinyl acetate based on the ethylene into the liquid ethylene, and subsequently compressing the resulting mixture to polymerization pressure between 800 and 3000 atmospheres.

3. In a continuous process for the preparation of interpolymers of ethylene in the presence of a catalyst selected from the group consisting of oxygen and peroxy compounds, the steps which comprise continuously passing ethylene successively through a series of zones wherein it is compressed to pressures between 20 and 150 atmospheres, dried after compression, cooled under this pressure to a temperature between —35° C. and +5° C., mixed with a compound selected from the group consisting of vinyl esters, acrylic and methacrylic acid esters, compressed to pressures between 800 and 1500 atmospheres and after the introduction of the catalyst subjected to the interpolymerization reaction at a temperature between 50 and 400° C.

4. In a continuous process for the preparation of interpolymers of ethylene in the presence of a catalyst selected from the group consisting of oxygen and peroxy compounds, the steps which comprise continuously passing ethylene successively through a series of zones wherein it is compressed to pressures between 20 and 150 atmospheres, dried after compression, cooled under this pressure to a temperature between —35° C. and +5° C., mixed with a vinyl ester, compressed to pressures between 800 and 1500 atmospheres and after the introduction of the catalyst, subjected to the interpolymerization reaction at a temperature between 50 and 400° C.

5. In a continuous process for the preparation of interpolymers of ethylene in the presence of a catalyst selected from the group consisting of oxygen and peroxy compounds, the steps which comprise continuously passing ethylene successively through a series of zones wherein it is compressed to pressures between 20 and 150 atmospheres, dried after compression, cooled under this pressure to a temperature between —35° C. and +5° C., mixed with a methacrylic acid ester, compressed to pressures between 800 and 1500 atmospheres and after the introduction of the catalyst subjected to the interpolymerization reaction at a temperature between 50 and 400° C.

LOMBARD SQUIRES.

Certificate of Correction

Patent No. 2,395,381. February 19, 1946.

LOMBARD SQUIRES

It is hereby certified that errors appear in the printed specification of the above numbered patent requiring correction as follows: Page 1, second column, line 36, for "dried" read *drier*; page 2, first column, line 12, for "oxygene" read *oxygen*; page 3, first column, line 43, claim 1, for "300 atmospheres" read *3000 atmospheres*; and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.*